(12) United States Patent
Challener

(10) Patent No.: US 7,444,054 B2
(45) Date of Patent: *Oct. 28, 2008

(54) APPARATUS FOR FOCUSING PLASMON WAVES

(75) Inventor: William Albert Challener, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/504,180

(22) Filed: Aug. 15, 2006

(65) Prior Publication Data

US 2006/0274611 A1    Dec. 7, 2006

Related U.S. Application Data

(63) Continuation of application No. 10/338,078, filed on Jan. 6, 2003, now Pat. No. 7,106,935.

(60) Provisional application No. 60/346,378, filed on Jan. 7, 2002, provisional application No. 60/346,379, filed on Jan. 7, 2002, provisional application No. 60/346,431, filed on Jan. 7, 2002.

(51) Int. Cl.
*G02B 6/10*      (2006.01)
*G11B 7/135*    (2006.01)

(52) U.S. Cl. .................................. 385/129; 369/13.32

(58) Field of Classification Search .............. 369/13.32, 369/13.33; 385/129; 360/59; *G11B 7/135, G11B 5/02; G02B 6/10*
See application file for complete search history.

(56) References Cited

U.S. PATENT DOCUMENTS

| 5,077,822 | A | 12/1991 | Cremer |
| 5,199,090 | A | 3/1993 | Bell |
| 5,831,743 | A | 11/1998 | Ramos et al. |
| 5,991,488 | A | 11/1999 | Salamon et al. |
| 6,236,783 | B1 | 5/2001 | Mononobe et al. |
| 6,285,020 | B1 | 9/2001 | Kim et al. |
| 6,333,497 | B2 | 12/2001 | Shimada et al. |
| 6,408,123 | B1 | 6/2002 | Kuroda et al. |
| 6,421,128 | B1 | 7/2002 | Salamon et al. |
| 6,441,359 | B1 | 8/2002 | Cozier et al. |

(Continued)

FOREIGN PATENT DOCUMENTS

JP    2000-173093    6/2000

(Continued)

*Primary Examiner*—Aristotelis M Psitos
(74) *Attorney, Agent, or Firm*—Robert P. Lenart, Esq.; Pietragallo Gordon Alfano Bosick & Raspanti, LLP

(57) ABSTRACT

An apparatus comprises a thin film metallic layer, a first dielectric layer arranged on a first side of said thin film metallic layer and having a first index of refraction, a second dielectric layer arranged on the opposite side of said thin film metallic layer from said first dielectric layer, a third dielectric layer arranged on the first side of the thin film metallic layer adjacent to the first dielectric layer and having a second index of refraction that is lower than the first index of refraction, and wherein the thin film metallic layer, the first dielectric layer and the third dielectric layer are arranged to focus plasmon waves induced at an interface between the thin film metallic layer and the third dielectric layer.

10 Claims, 9 Drawing Sheets

U.S. PATENT DOCUMENTS

| | | |
|---|---|---|
| 6,768,556 B1 | 7/2004 | Matsumoto et al. |
| 6,795,630 B2 | 9/2004 | Challener et al. |
| 6,834,027 B1 | 12/2004 | Sakaguchi et al. |
| 7,106,935 B2 * | 9/2006 | Challener .................. 385/129 |
| 2001/0006435 A1 | 7/2001 | Ichihara et al. |

FOREIGN PATENT DOCUMENTS

| | | |
|---|---|---|
| JP | 2000-346855 | 12/2000 |
| JP | 2001-141634 | 5/2001 |
| JP | 2001-184692 | 7/2001 |

* cited by examiner

APPARATUS FOR FOCUSING PLASMON WAVES

CROSS-REFERENCE TO RELATED APPLICATIONS

This application is a continuation of U.S. patent application Ser. No. 10/338,078, filed on Jan. 6, 2003, which claims the benefit of U.S. Provisional Patent Applications Ser. No. 60/346,378, filed on Jan. 7, 2002, No. 60/346,379, filed on Jan. 7, 2002, and No. 60/346,431, filed on Jan. 7, 2002, all of which are herein incorporated by reference.

BACKGROUND OF THE INVENTION

1. Field of the Invention

The invention relates to the field of near field optics and more particularly to its use in heat assisted magnetic recording.

2. Description of the Related Art

Heat assisted magnetic recording (HAMR) involves heating a spot on the disk surface to reduce its coercivity sufficiently so that it can be magnetically recorded. The advantage of this technique is that the coercivity of the media at ambient can be significantly increased, thereby improving thermal stability of the recorded data even for very small bit cells. One of the difficulties with the technique is finding a method to heat just the small area of media which is to be recorded. Heating with laser light, as is done in magneto-optic recording, is the most promising approach, but the difficulty with this is that at the current storage densities contemplated for HAMR, the spot to be heated is ~25 nm in diameter, which is fifty times smaller than the wavelength of useful semiconductor lasers. The so-called diffraction limit in optics is the smallest dimension to which a light beam can be focused. The diffraction limit in three dimensions is given by the equation $$d = \frac{0.6\lambda}{n\sin\theta} \quad (1)$$

where d is the spot diameter, λ is the wavelength of the light in free space, n is the refractive index of the lens, and θ is the maximum angle of focused light rays from the central axis of the lens. The factor 1/n is the wavelength of the light within the lens. The spot diameter is directly proportional to the wavelength of the light within the lens. The minimum focused spot diameter in the classical diffraction limit is ~λ/2, which is much too large to be useful for HAMR.

When light is incident upon a small circular aperture, it is well-known in classical optics that the amount of power transmitted through the aperture scales as the ratio of the aperture to the wavelength raised to the fourth power [H. A. Bethe, "Theory of Diffraction by Small Holes" Phys. Rev. 66 (1944) 163-182]. In other words, the amount of light which can be transmitted through an aperture with a ~25 nm diameter at a wavelength of 500 nm is ~6×10⁶ of the amount that would be expected for the size of the hole. This throughput is orders of magnitude too small to be practical for HAMR.

Therefore, there is a need to focus or confine energy from a light source having a wavelength on the order of 500 nm or greater into a spot whose diameter is on the order of 25 nm with high transmission efficiency. The relevant art provides no solution.

SUMMARY OF THE INVENTION

In a first aspect, the invention provides an apparatus comprising a thin film metallic layer, a first dielectric layer arranged on a first side of said thin film metallic layer and having a first index of refraction, a second dielectric layer arranged on the opposite side of said thin film metallic layer from said first dielectric layer, a third dielectric layer arranged on the first side of the thin film metallic layer adjacent to the first dielectric layer and having a second index of refraction that is lower than the first index of refraction, and wherein the thin film metallic layer, the first dielectric layer and the third dielectric layer are arranged to focus plasmon waves induced at an interface between the thin film metallic layer and the third dielectric layer.

In another aspect, the invention provides an apparatus comprising a thin film metallic layer, a first dielectric layer arranged on a first side of said thin film metallic layer and having a first index of refraction, and a second dielectric layer arranged on a side of the first dielectric layer opposite of the thin film metallic layer, the second dielectric layer having a second index of refraction that is higher than the first index of refraction, wherein the thin film metallic layer, the first dielectric layer and the second dielectric layer are arranged in a conical shape to direct plasmon waves induced at an interface between the thin film metallic layer and the first dielectric layer to an aperture.

BRIEF DESCRIPTION OF THE DRAWINGS

FIG. 3b is a cross-sectional view of the lens of FIG. 3a.

DETAILED DESCRIPTION OF THE INVENTION

Figure 1:
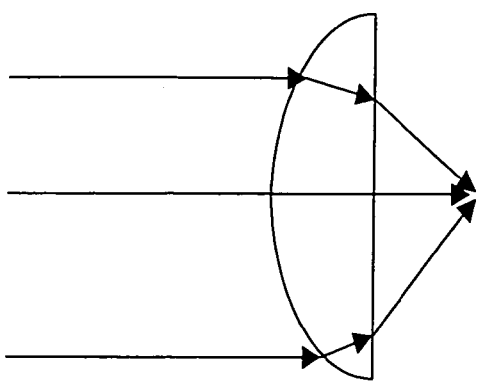
FIG. 1 is the illustration of a lens focusing a light beam on a spot.
Figure 2:
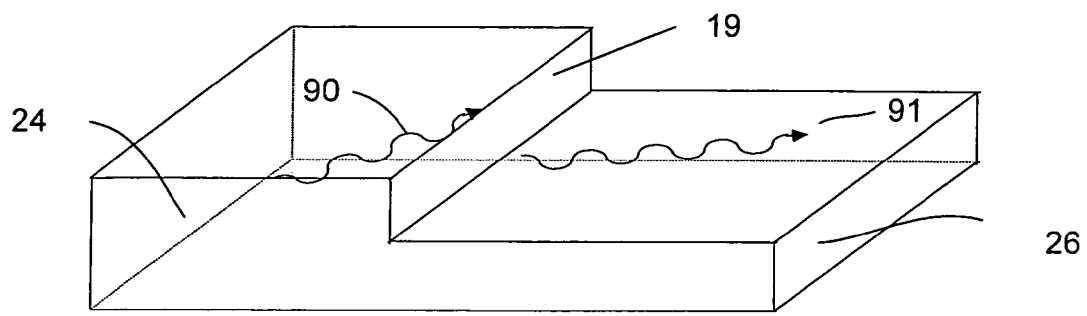
FIG. 2 is a representation of a bi-thickness metallic layer conducting and diffracting a plasmon wave.

The Appendix describes the science of plasmon waves, in connection with FIGS. 1 and 2, and provides a theory of operation of the present invention. The first embodiment of the present invention is illustrated in FIGS. 3a and 3b.

Figure 3A:
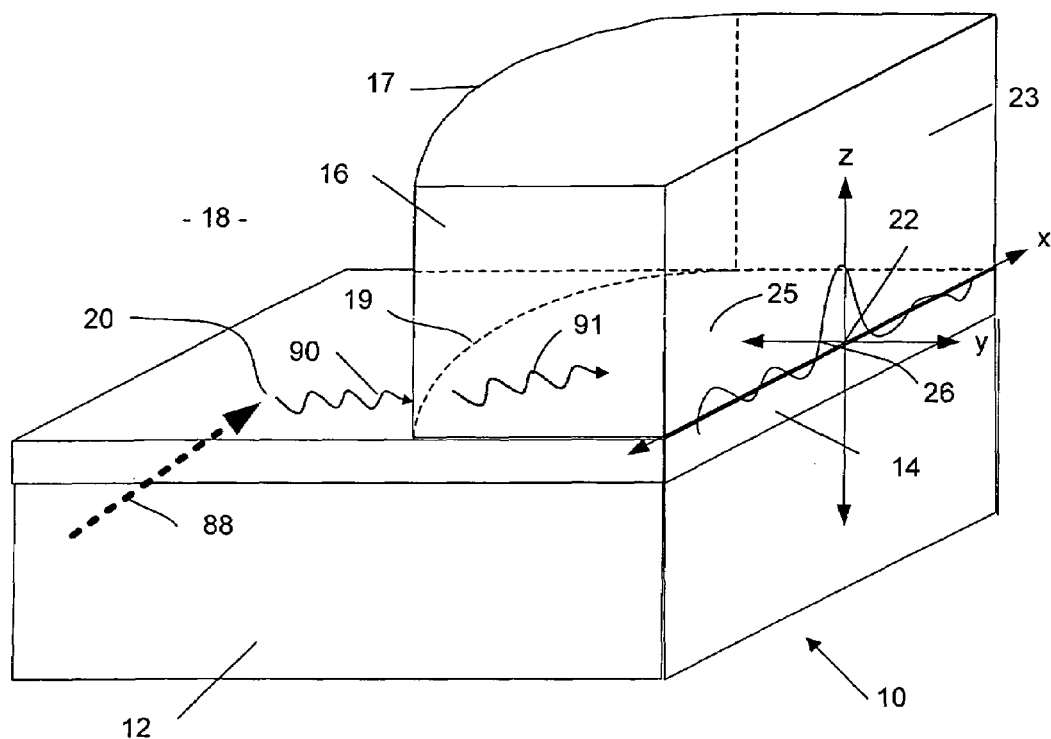
FIG. 3a is a perspective view of a plasmon wave lens according to an embodiment of the invention.
Figure 3B:
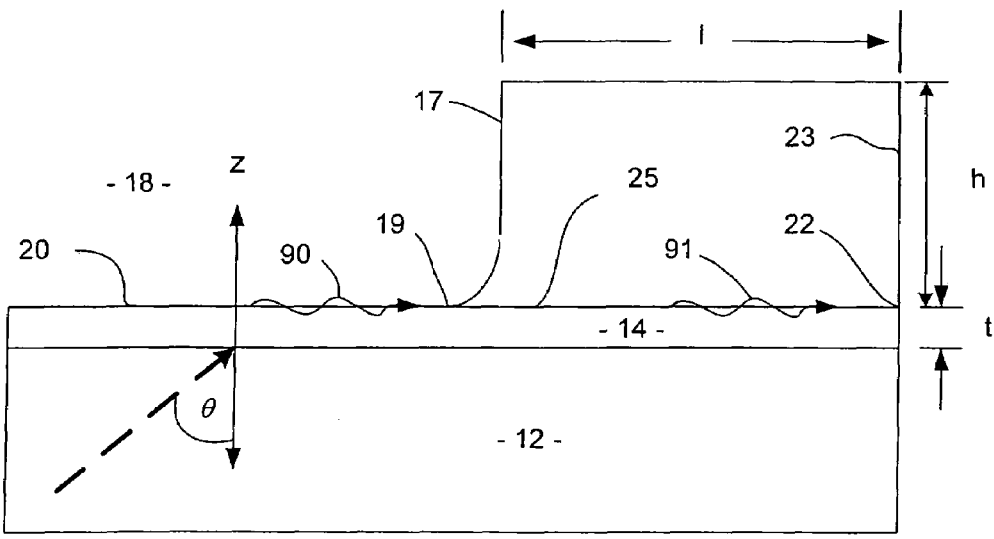

FIG. 3a is a perspective view of a plasmon lens 10 that converts incident light beam 88 into a plasmon wave 90, and diffracts the waves at a lens surface 17 into a refracted plasmon wave 91 that is focused on a spot 22 located on a flat surface 23 of the lens 10. At the flat surface 23, the plasmon wave 91 converts back into light, which may be used to observe a sample in a microscope application, or to heat the surface of a disc in a magnetic recording application.

The lens 10 structure consists of a pair of high index dielectric layers 12, 16 which may be made of $SiO_2$, SiN, $Ta_2O_5$, ZnS, $TiO_2$, Si or other high index materials known in the art, sandwiching a thin (typically <50 nm), highly conducting metallic layer 14 which may be made of gold, silver, aluminum, or copper. The space 18 above the gold layer 14 is a dielectric material with a lower refractive index than dielectrics 12 and 16 and may be, for example, air, $MgF_2$, $SiO_2$ or $Al_2O_3$. In one embodiment, the indices of refraction at a wavelength of 633 nm are 1.0 for dielectric 18 made of air, 1.5 for both dielectrics 12 and 16 made of $SiO_2$, and 0.183+i (3.09) for a 50 nm layer of metal 14 of gold. Referring to FIG. 3b, a light beam 88, which can be a laser beam, with a wavelength of 633 nm is incident on the gold layer 14 at an angle θ of, for example, 45°. This beam 88 excites a surface plasmon 90 at the air/gold interface 20 that propagates towards the right. Essentially all of the incident light beam is coupled into the antisymmetric, leaky mode of the surface plasmon at this angle. The effective refractive index, which is the wavevector of the surface plasmon normalized by the wavevector of the incident light ($2\pi/\lambda$), for this mode is 1.05.

As the surface plasmon propagates to the right, it encounters edge 19 of symmetric glass/gold/glass trilayer structure comprising upper glass lens 16, the gold layer 14 and the glass substrate 12. The plasmon wave is here refracted into the plasmon wave 91. This wave continues to travel on the surface 25 between the gold layer 14 and the upper glass lens element 16. The effective refractive index for the antisymmetric surface plasmon mode on this surface 25 is 2.35 even though the optical refractive index of the glass is only 1.5. Referring still to FIG. 3b, the thickness h of the upper glass lens element 16 is approximately 1 µm and may range from 200 nm to 10 µm depending on thicknesses and refractive indices of all materials in the film stack. The lens surface 17 of the upper glass lens element 16 tapers as it approaches gold layer 14. The greater the taper at this point 19 the better so as to make the transition of the plasmon wave 90 into the trilayer region surface 25 gradual.

In two dimensions the diffraction limit is slightly smaller than in three dimensions. The correct equation is, $$d = \frac{0.5\lambda}{n\sin\theta}. \quad (2)$$

This lens structure 10 for a surface plasmon provides a diffraction limited spot size that is about half that of a glass solid immersion lens, i.e., ~135 nm. Furthermore, if the gold layer thickness t is reduced from 50 nm down to 10 nm in the trilayer region between the lens junction 19 and surface 23, i.e., at surface 23, the effective index of the surface plasmon increases to 4.82. This corresponds to a diffraction limit of 66 nm.

By increasing the refractive index of the dielectric layers the spot size can be further reduced. The effective index for a surface plasmon supported by a 10 nm gold layer between two dielectric layers with refractive indices of 2 is 9.18, which corresponds to a spot size in the diffraction limit of 34 nm. This is the regime of interest for HAMR.

Referring again to FIG. 3a, the electric field amplitude 26 at the junction of surfaces 23 and 25 is illustrated. This field 26 has a maximum z-axis intensity at spot 22. However, the field 16 drops to its 1/e value at 15 nm above and below the center of the gold film, so the surface plasmon is confined in both the x and z dimensions.

Figure 4:
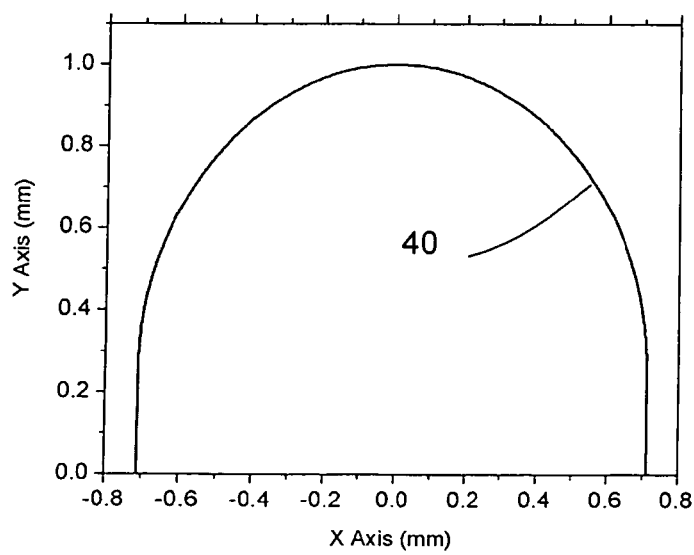
FIG. 4 is a chart of the curvature of the lens surface of the first embodiment.

FIG. 4 is a chart showing the curvature 40 of surface 17 of upper lens element 16. The curvature 40 is derived using the standard procedures for designing lens curvatures for an SPR SIL lens with a length l (see FIG. 3b) in the y dimension of 1 mm with an origin 0,0 at the focal point 22 on surface 23. In this case, the wavelength is 633 nm, the metal is gold with an initial thickness of 50 nm (and an effective refractive index of 3.01) and final thickness of 10 nm (and effective refractive index of 9.18) surrounded by a dielectric with an index of 2.

Two issues that must be taken into consideration are (1) the surface plasmon is lossy, especially at large effective indices, and so will dissipate heat within the lens 10, and (2) at the junction 19 between the two regions 22 and 25 of different effective index there is an impedance mismatch for the surface plasmon and so some energy will be reflected at the junction 19 just as in a standard optical lens. This effect can be minimized by gradually tapering the air/glass junction as illustrated in FIG. 3a, but then the calculation of the necessary curvature 40 at the junction is more complicated because depending on the exact shape of the taper, the refraction or bending of the surface plasmon will be more or less gradual rather than abrupt.

FIG. 2, discussed in the Appendix, illustrates a dual-metal layer variation. This dual thickness metallic layer, illustrated in FIG. 2, may replace the single layer 14 shown in FIG. 3 and may supplement or replace the upper glass layer 16. The two layers, 24 and 26, have different effective indices of refraction depending upon thickness, with a thinner layer 26 having a higher index of refraction than a thicker layer 24. The interface 19 between the two areas of different thickness may be curved, as is lens surface 17 illustrated in FIG. 3a, and to form a lens that focuses or assists in focusing the plasmon wave to spot 22.

Figure 5:
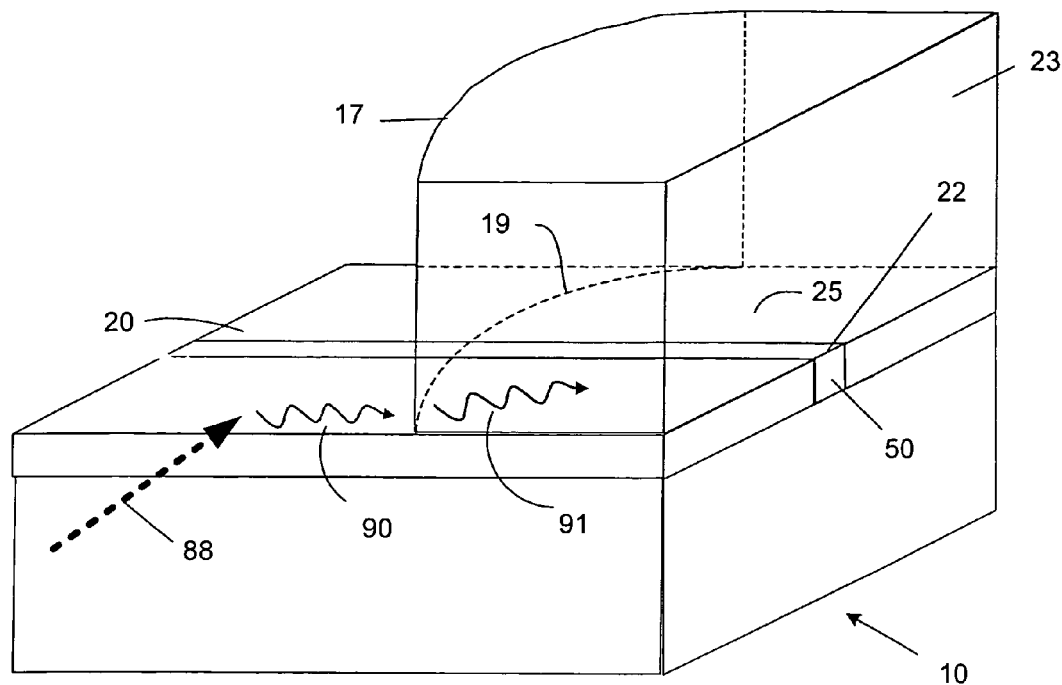
FIG. 5 is a perspective view of a plasmon wave lens according to another embodiment of the invention that includes a magnetic pole.
Figure 6:
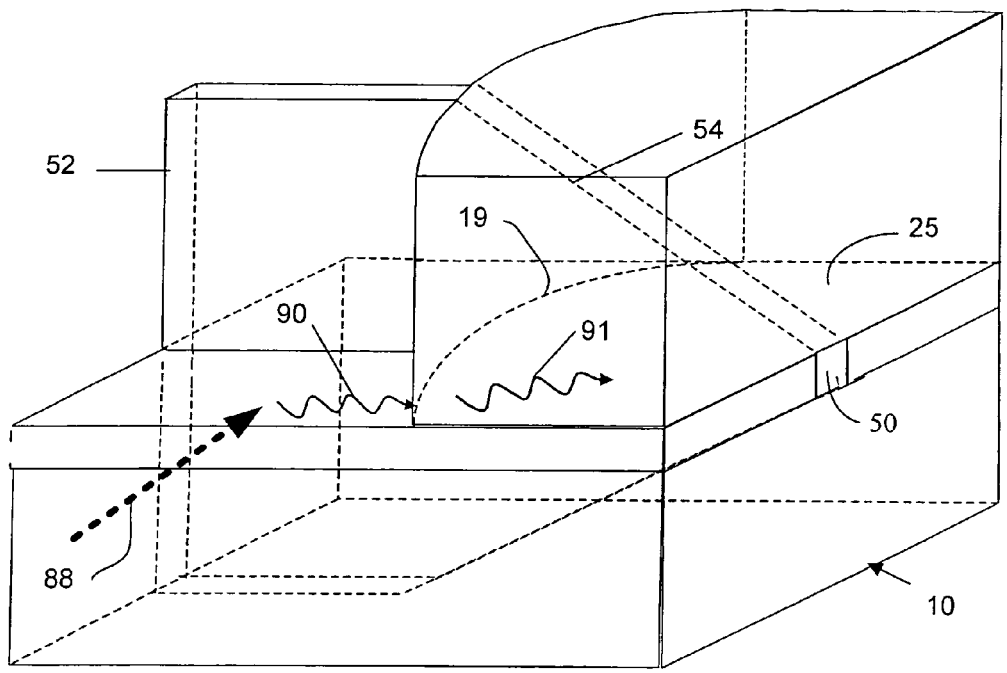
FIG. 6 is a perspective view of a plasmon wave lens according to another embodiment of the present invention that includes a tapered magnetic pole.
Figure 7:
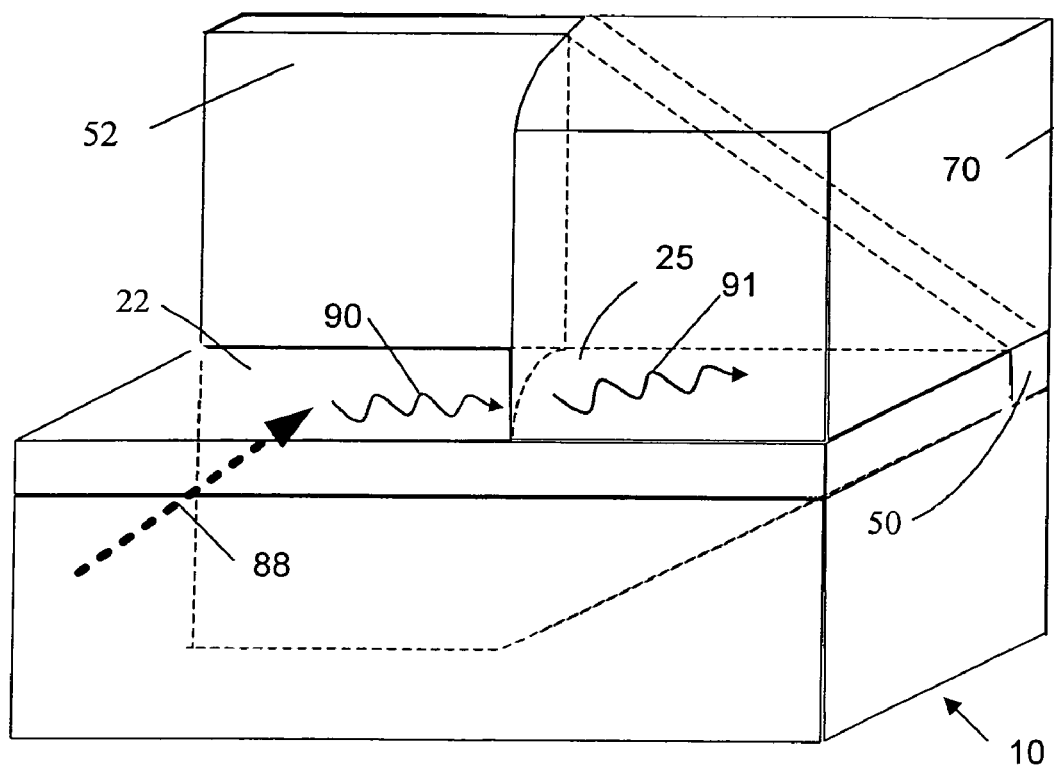
FIG. 7 is a perspective view of a plasmon wave lens according to another embodiment of the present invention that includes a tapered magnetic pole forming one surface of half lens embodiment.

Referring again to FIGS. 3a and 3b, lens 10 focuses the plasmon wave on the flat surface 23 of the trilayer structure (glass layers 12 and 16, and gold layer 14) at approximately point 22. There the plasmon waves convert back into visible light. Without more, this structure is useful with optical scanning microscopes. It may also be used in HAMR to heat adjacent media. However, in the latter application, it is also important to locate the magnetic pole used to induce magnetic flux into the magnetic media as closely as possible to the focus 22 of the plasmon wave. Heat assisted magnetic recording (HAMR) requires near co-location of the optical spot generating heat in the medium with the magnetic recording pole in order to record rectangular marks without erasing neighboring tracks. FIGS. 5-7 illustrate several approaches to integrating such a magnetic pole into lens 10.

In FIG. 5, a narrow recording pole 50 (composed of a magnetic permeable material such as Permalloy) runs down the central axis of the lens 10. Surface plasmons near this central axis propagating along the gold/dielectric interface 20/25 may be partially absorbed by the lossy recording pole material. For this reason the pole 50 should generally be kept as narrow, for example, less than 50 nm, as possible while still allowing a sufficient recording field to be generated within the recording medium. However, surface plasmons 90 which are incident upon the lens surface 19 away from the central axis are still refracted to the focal point 22 at the face of the recording pole without being disturbed by the pole material.

FIG. 6 shows a tapered recording pole 50. This recording pole 50 structure includes a structure that spans the entire thickness of lens 10 towards an anterior portion 52, that narrows through an intermediate section 54 towards pole tip 50. This tapered pole structure 52, 54 conducts more magnetic flux to pole tip 50 without degrading the plasmon focusing performance of the lens 10.

FIG. 7 illustrates a half lens embodiment that is more easily manufactured. This variation eliminates one side of the lens 10, e.g., to the right of edge 70. Edge 70 is aligned with the right edge of pole tip 50.

Figure 8:
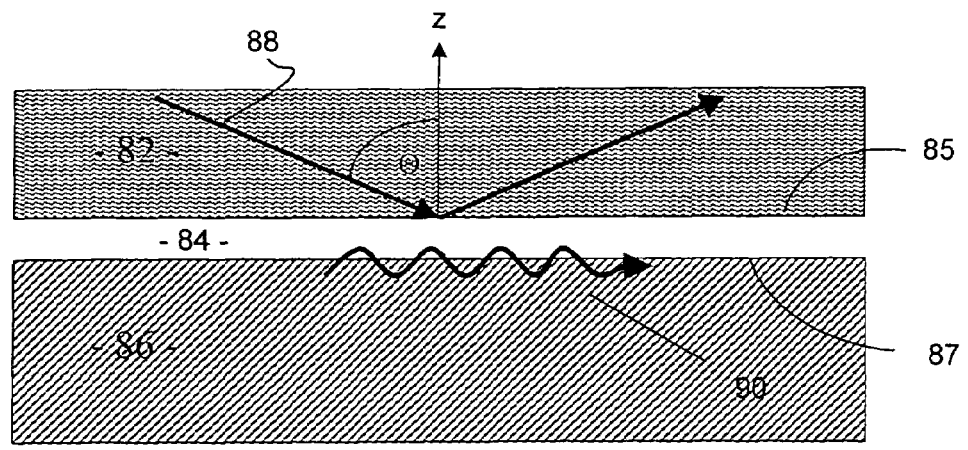
FIG. 8 is an illustration of the essential layers of a plasmon wave focusing probe structure according to other embodiments of the present invention.

FIG. 8 illustrates a second technique for optically exciting surface plasmons. Here, light 88 propagates through a high index of refraction medium 82, such as glass, and is incident upon a planar interface 85 with a dielectric film 84, such as air, having a lower index of refraction, at an angle θ above the critical angle at which the beam induces plasmon waves. Because the angle of incidence θ is above the critical angle, the light 88 is totally internally reflected at the interface, as illustrated. However, this light beam 88 imparts an evanescent field that extends into the dielectric film 84. If a metal layer 86 is brought within range of this evanescent field, a surface plasmon 90 is excited by the field at the surface 87 of the metal.

Figure 9:
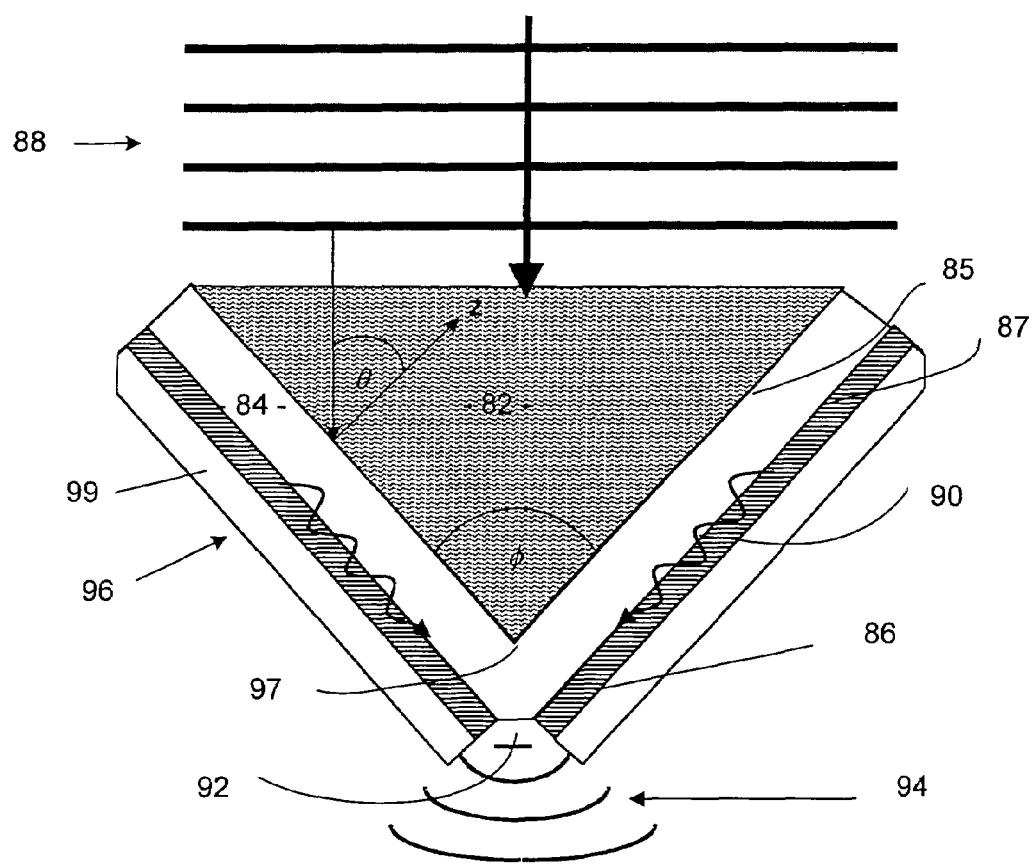
FIG. 9 is a cross-sectional view of another embodiment of the invention that is structured in the shape of a cone.

FIG. 9 is a near field probe 96 that employs the present invention for exciting surface plasmons. This "probe" structure has some distinct advantages for both HAMR and scanning microscope applications.

This probe 96 is constructed with a layer 86 of a metal like gold, silver, copper or aluminum on the surface of a cone-like cladding 99 having an aperture 92. Cladding 99 may be formed of a protective dielectric material such as glass. The various layers of the probe form an angle φ at their apexes, illustrated in FIG. 9 at apex 97 of high dielectric layer 82.

The thickness of the metal film layer 86 is not critical. In general, it should be sufficiently thick, from about 20 to 50 nm, such that no light is transmitted through it. The metal film layer 86 adheres to a thick dielectric film 84 (from about 200 to 800 nm in thickness) with a low index of refraction, which may be anywhere below 1.70. This thick dielectric film 84 is in turn coated upon an inner dielectric cone 82, such as glass, with a higher index of refraction. The entire probe now consists of three layers: two different dielectrics 82, 84 and a metal film 86, all mounted on a protective dielectric cladding 99.

A plane wave 88 of light is incident on the probe 96 as illustrated. It propagates within the high index dielectric 82 towards the aperture 92. It strikes the high refractive index/ low refractive dielectric layer interface 85 at an angle of incidence θ above the critical angle as illustrated. This excites plasmon wave 90 at the low refractive index dielectric film layer/metal layer interface 87. The surface plasmon 90 propagates along the inside surface 87 of the metal film and has no evanescent tails extending out into the air due to the thick metal film 86. The electric field from plasmon 90 is shielded from the microscope sample or the magnetic recoding disk until the surface plasmon 90 reaches the aperture 92 at the apex of the cladding 99. The plasmon tunnels through the aperture 92 and emits light radiation 94 into the sample adjacent the aperture 92.

The aperture 92 for HAMR applications may range from 20 to 50 nm in size. For probe applications, the aperture 92 may be as large as 100 nm.

Figure 10:
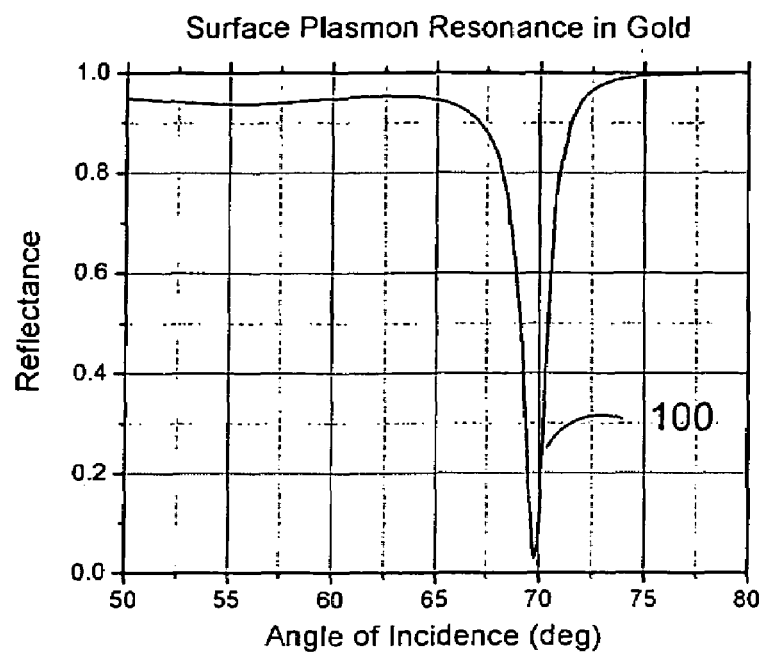
FIG. 10 is a chart of plasmon resonance vs. beam angle of incidence for gold.

In a specific example, the incident light beam 88 has a wavelength of 1000 nm. The refractive index of gold at this wavelength is 0.257+i(6.82). The inner high index dielectric 82 is chosen to be glass with n=1.5, and the outer low index dielectric cladding 84 is chosen to be $MgF_2$ with n=1.38 and a thickness of 1000 nm. $MgF_2$ is a common material used in optical thin films for anti-reflection coatings, dielectric mirrors, etc. Referring to FIG. 10, a chart of reflectance vs. angle of incidence of a properly polarized beam of light incident on gold, the plasmon resonance angle is ~70°. At this angle, the reflectance curve 100 indicates that nearly all of the incident light is absorbed into creating a surface plasmon. Referring again to FIG. 9, the incident plane wave 88 has an angle of incidence of 70° from the normal to the gold surface. This is the same angle θ that beam 88 is incident on the high refractive index dielectric/low refractive index dielectric interface 85. In order for the beam 88 to have a 70° angle of incidence θ on interface 85, the angle φ of the probe 96 at its apex 97 is 2·(90°−70°)=40°.

An advantage of the probe structure is that the outer metal film can be coated with a protective dielectric 99 without interfering with the operation of the surface plasmon dynamics. This in turn allows the use of silver in place of gold. Silver tarnishes over time when exposed to air and would, therefore, be unsuitable for a probe design without some corrosion protection. Because silver is a much better electrical conductor than gold, the fields produced by the surface plasmon in silver are larger. Moreover, silver can be used to generate surface plasmons at much shorter wavelengths than are possible with gold, which in turn enhances the efficiency with which the surface plasmon is propagated through the aperture at the tip. Finally, by using silver the thickness of the low index dielectric cladding can be greatly reduced.

Figure 11:
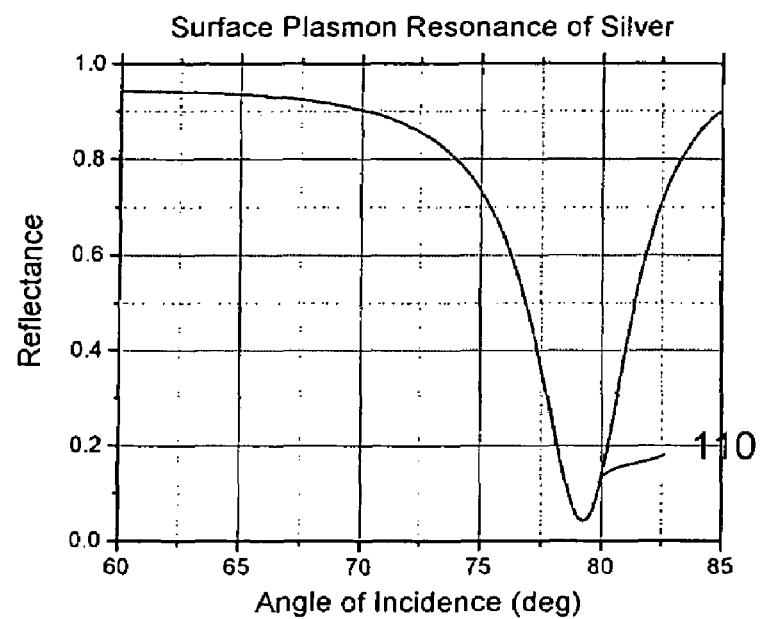
FIG. 11 is a chart of plasmon resonance vs. beam angle of incidence for silver.

FIG. 11 is a chart of beam reflectance vs. angle of incidence for silver. The reflectance curve 110 indicates that the silver plasmon resonance angle is ~79°. This is where nearly all of the incident light is absorbed into creating a surface plasmon.

Referring again to FIG. 9, the probe has the following structure when silver is used for metal layer 86. Beam 88 has a wavelength of 635 nm. This is a common wavelength available from semiconductor lasers. The refractive index of silver at this wavelength is 0.135+i(4.00). The inner high index dielectric 82 is again glass with n=1.5. The outer, low index dielectric cladding 84 is again $MgF_2$ with n=1.38 and a thickness of 400 nm. In accordance with FIG. 11, the resonance angle is ~79°. This then is the angle of incidence θ of beam 88 on interface 85. The apex angle φ of the probe 96 is ~22°.

Figure 12:
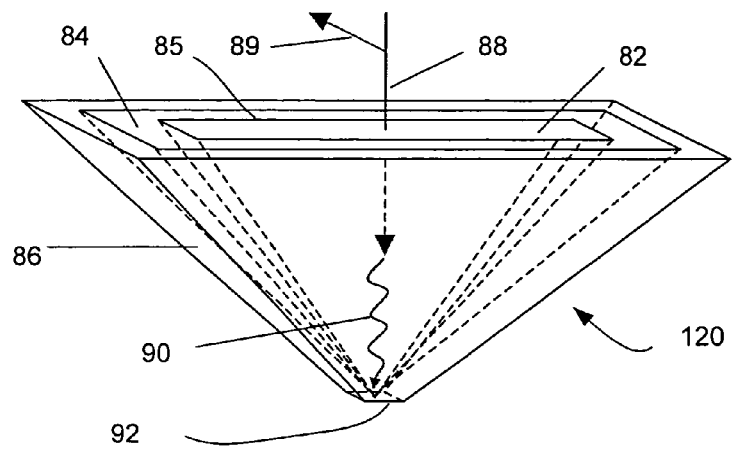
FIG. 12 is an outline perspective view of another cone-shaped embodiment of the present invention.

FIG. 12 illustrates a probe 120 having rectangular cone structure shown without a protective cladding 99 for the sake of clarity. A rectangular cone provides compatible geometry because the angle of incidence at the surface of the cone is a constant for a plane wave entering the top of the cone along the cone axis. Only the polarization component 89 of the incident beam 88 that is parallel to the plane of incidence (the TM or p-polarization component) excites a surface plasmon. The rectangular cone provides the most cone surface area as possible to receive this polarization of the incident light beam.

In FIG. 12, the outer metal layer 86 is composed of either gold or silver. The low index of refraction dielectric layer 84 is preferably composed of $MgF_2$. The central, high index of refraction layer 82 is composed of glass. Incident light beam 88 preferably is polarized as shown with the p-polarization 89 parallel to the elongated interface 85 between the glass 82 and $MgF_2$ layers 84. Alternatively, the incident light beam 88 may be infrared radiation. In this case, the high index layer 82 could be silicon with a refractive index of 3.6 at a wavelength of 900 nm. A wide range of materials, such as $SiO_2$ and SiN, may be available for the low index dielectric layer 84.

Figure 13:
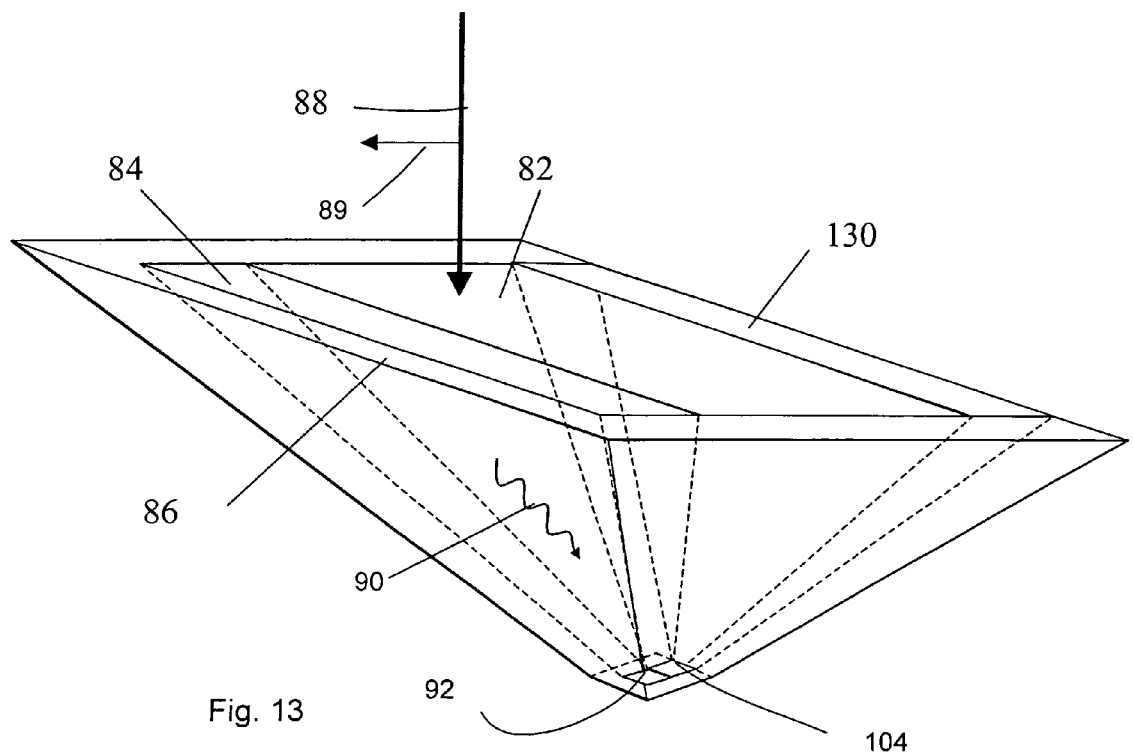
FIG. 13 is an outline perspective view of another cone-shaped embodiment of the present invention that includes a magnetic pole.

FIG. 13 illustrates a variation for HAMR. For this application, a magnetic recording pole must be co-located with the source of near field radiation. A geometry that would co-locate the probe and recording pole is illustrated in FIG. 13. In this structure, the functioning probe structure, dielectric layers 82 and 84, and metal layer 86, uses only half of a cone located adjacent to a recording pole 130.

The configuration of this embodiment is identical to that of FIG. 12, with the addition of magnetic pole layer 130 replacing the metallic and low index of refraction dielectric layers, 86 and 84, along one major surface of the rectangular cone. The magnetic pole 130 terminates in pole tip 104 adjacent to the aperture 92 that emits light from the plasmon waves.

The above description of the preferred embodiments is not by way of limitations on the scope of the appended claims. In particular, those of ordinary skill in the art may substitute other materials for the disclosed materials and other focusing structures than those described here. For example, copper or aluminum may generally replace gold or silver in the preceding examples.

Appendix—The Science of Plasmons.

Surface plasmons are electromagnetic excitations which propagate along the surface of a conductor and have a specific energy, momentum, and wavelength. Surface plasmons involve coupling between the electrons in the conductor and a light wave. It is possible to design structures with surface plasmons with wavelengths much smaller than that of the light wave used to excite them. Therefore, in principle the surface plasmons may be confined more tightly than freely propagating light waves.

Surface plasmons have an energy and a momentum. The energy and frequency of the surface plasmon are directly related via the equation $$E = h\nu = \eta\omega, \quad (3)$$

where h is Plank's constant, $$\eta = \frac{h}{2\pi},$$

E is the energy, $\nu$ is the frequency, and $\omega$ is the angular frequency=$2\pi\nu$. Similarly, the momentum p is directly related to the wavevector, denoted by the letter k, $$p = \eta k. \quad (4)$$

For a specific geometry and material properties the energy and momentum of the surface plasmon are directly related. This is known as the "dispersion relation." For example, at the surface between a metal with a dielectric constant of $\epsilon_m$ and a dielectric with a dielectric constant of $\epsilon_d$ the dispersion relation for the surface plasmon is $$\beta = \left(\frac{\omega}{c}\right) \cdot \sqrt{\frac{\epsilon_d \cdot \epsilon_m}{\epsilon_m + \epsilon_d}} \quad (5)$$

where c is the speed of light in vacuum. In this case we represent the surface wavevector by the Greek letter $\beta$ to indicate that it is the component of the total wavevector which lies in the plane of the surface. The component of the wavevector perpendicular to the surface has an imaginary value because the amplitude of the electric field of the plasma wave is exponentially decreasing in this direction and there is no energy propagation in this direction. The field is said to be evanescent.

Figure 15:
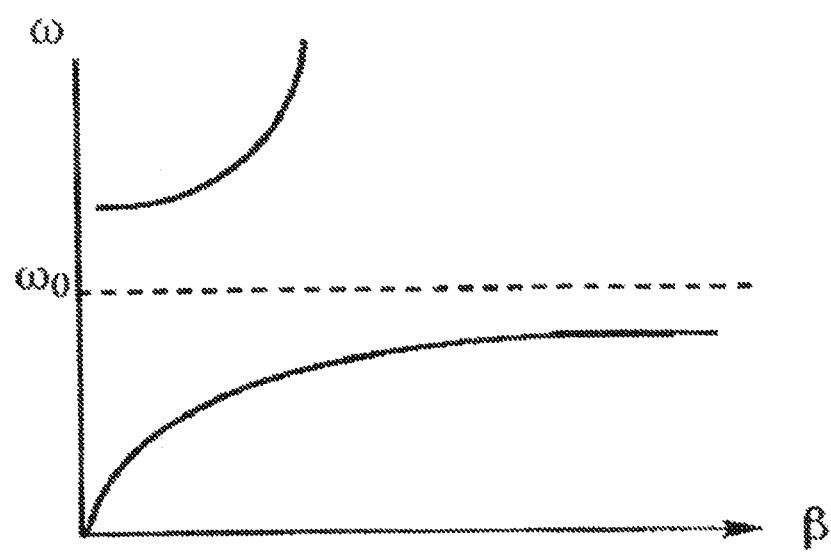
FIG. 15 is a graph of a dispersion relation.

In a widely referenced review article on surface plasmons [Physics of Thin Films, 9 (Academic Press, New York, 1977), 145-261] H. Raether discusses the dispersion relation in detail for the case of a Drude model of the dielectric function of a simple metal. The dispersion relation is found to look like the graph shown in FIG. 15.

One key aspect to note about this graph is that unlike the case of light photons, for surface plasmons (at least in this simple model) there exists a finite frequency, $\omega_0$, for which the wavevector of the surface plasmon approaches infinity and, therefore, for which the wavelength goes to zero. According to the diffraction limit in Eq. (1), be possible to spatially confine surface plasmons with small wavelengths much more tightly than photons.

The dispersion relation becomes considerably more complicated for more complicated geometries. For a thin metal film sandwiched between two different dielectrics there are at least four different surface plasmon modes possible, each with its own dispersion relation. The dispersion relations can be calculated for this geometry as described in the article, J. J. Burke, G. I. Stegman, T. Tamir, "Surface-polariton-like waves guided by thin, lossy metal films" Phys. Rev. B 33 (1986) 5186-5201. Once again the dispersion curve is found to exhibit an asymptotic region for large wavevectors. The precise values for the dispersion curve depend on the thickness of the metal film and the dielectric constants of the metal and surrounding dielectrics. The theory for multilayered systems has been described by A. Dereux, J.-P. Vigneron, P. Lambin, and A. Lucas in Phys. Rev. B 38 (1988) 5438-5452.

A standard optical lens is designed so that the curvature of the surface causes an incident plane light wave to refract at the surface(s) of the lens in such a manner that all light rays are bent towards a common focus. The degree of bending at the surface is determined by Snell's law, $$n_1 \sin \theta_1 = n_2 \sin \theta_2 \quad (6)$$

where $n_{1,2}$ is the refractive index of medium (1, 2) and $\theta_{1,2}$ is the angle of incidence of the light ray in medium (1, 2). The equations of curvature for the surfaces of the lens make use of Snell's law to insure that light rays incident at different points on the first surface eventually are refracted to the same focal point as shown in FIG. 1.

Now consider the following situation illustrated in FIG. 2. A surface plasmon 90 is propagating along the surface of a thin metal film when it reaches a region for which the thickness of the metal film suddenly changes. Snell's law, which ensures that the wavefronts in each region match correctly at the boundary, must also apply to the surface plasmon propagation in this two-dimensional geometry as it does for light. As a result, the surface plasmon wave 90 will be refracted at the interface into a refracted wave 91 having a different direction, as shown in FIG. 2.

Clearly, the next step as in standard lens design, is to design a curved interface between the two regions so that an incident surface plasmon plane wave is refracted to a focus. The interface might occur at a step height change in the metal thickness, or it might correspond to a change in metal or dielectric index. In order to apply Snell's law of refraction, we need to know the effective refractive index of the surface plasmon in the two regions. The effective refractive index is simply the factor which multiplies the quantity ($\omega$/c) in the dispersion relation for β. In particular, for the case of the simple dielectric/metal interface described by Eq. (5), the effective refractive index is $$n_{SP} = \sqrt{\frac{\varepsilon_d \cdot \varepsilon_m}{\varepsilon_m + \varepsilon_d}}. \quad (7)$$

For more complicated structures Maxwell's equations must be solved either analytically or numerically to determine the effective refractive index for the surface plasmon.

For the formula for computing the effective refractive index, the paper Burke, Stegeman and Tamir, Phys. Rev. B vol. 33 (1986) 5186-5201 gives the complete derivation. Their Eq. (7) is the one which has to be solved (numerically on a computer):

$$\tan h(S_2 h)(\in_1 \in_3 S_2^2 + \in_m^2 S_1 S_3) + [S_2(\in_1 S_3 + \in_3 S_1) \in_m] = 0. \quad (8)$$

In this equation $S_n$ stands for $ikz$ of layer n (where $i = \sqrt{-1}$ and kz is the component of the wavevector perpendicular to the plane of the films), h is the thickness of the middle (metallic) layer, and $\in_n$ is the dielectric constant of layer n. Layer 1 and layer 3 are the surrounding dielectric layers, and layer 2 is the metal film. The refractive index of each layer is related to the dielectric constant of the layer via the equation $$n^2 = \in. \quad (9)$$

Figure 14:
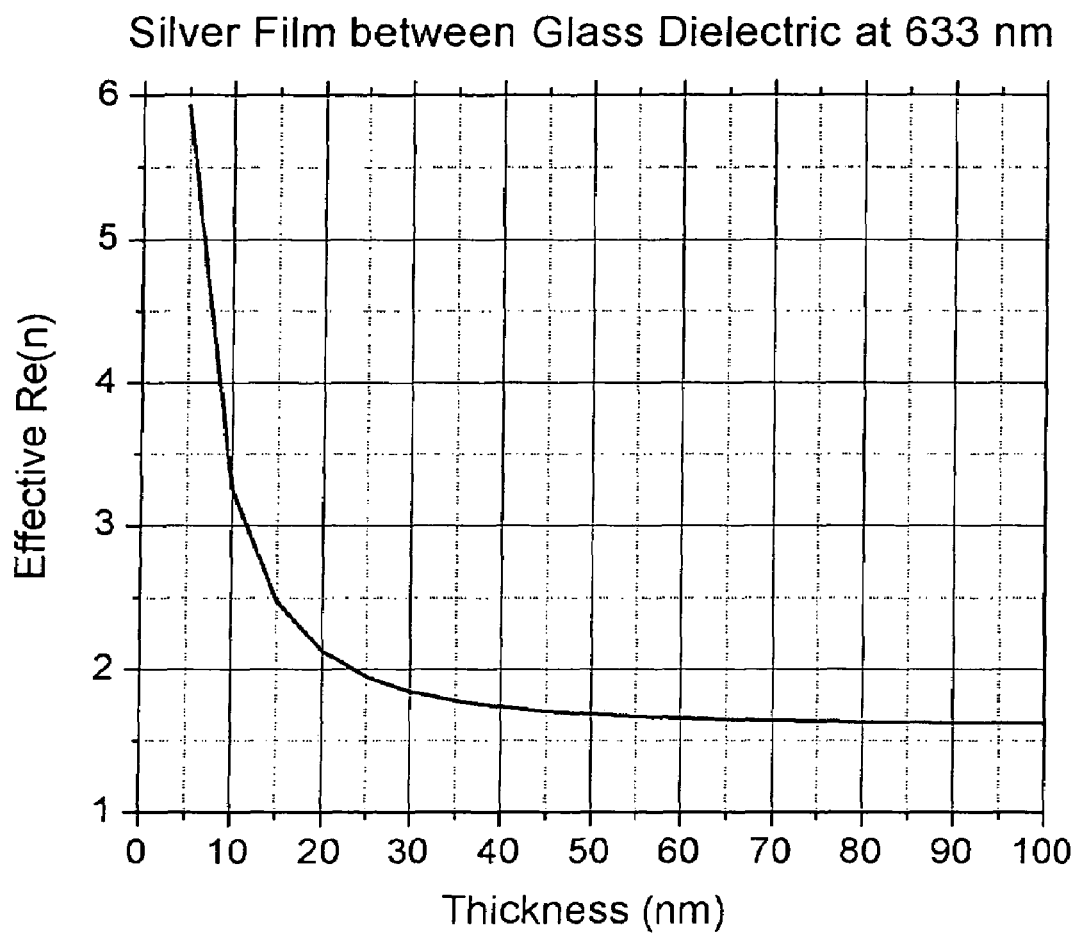
FIG. 14 is a chart of effective refractive index for a silver metal layer sandwiched between two glass layers.

The effective refractive index vs. thickness of a silver film which is sandwiched between two dielectrics with index=1.5 (i.e. glass) at a wavelength of 633, is illustrated in FIG. 14. Of course, for different metals, dielectrics, or wavelengths, the effective refractive index would be different.

What is claimed is:

1. An apparatus comprising:
   a thin film metallic layer;
   a first dielectric layer arranged on a first side of said thin film metallic layer and having a first index of refraction;
   a second dielectric layer arranged on the opposite side of said thin film metallic layer from said first dielectric layer;
   a third dielectric layer arranged on the first side of the thin film metallic layer adjacent to the first dielectric layer and having a second index of refraction that is lower than the first index of refraction; and
   wherein the thin film metallic layer, the first dielectric layer and the third dielectric layer are arranged to focus plasmon waves induced at an interface between the thin film metallic layer and the third dielectric layer.

2. An apparatus according to claim 1, wherein the first dielectric layer has a curved surface adjacent to the third dielectric layer.

3. An apparatus according to claim 1, wherein the thickness of the thin film metallic layer between the first and second dielectric layers is less than the thickness of the thin film metallic layer between the second and third dielectric layers.

4. An apparatus according to claim 1 wherein the thin film metallic layer includes a pole structure having an end positioned adjacent to a spot to which the plasmon waves are focused.

5. An apparatus according to claim 1 wherein the thin film metallic layer is selected from a group comprising one of: gold, silver, aluminum or copper.

6. An apparatus according to claim 1 wherein the third dielectric layer is selected from a group comprising one of: air, $MgF_2$, $SiO_2$, SiN or $Al_2O_3$.

7. An apparatus according to claim 1 wherein said first dielectric layer is selected from a group comprising one of: $SiO_2$, $Al_2O_3$, silicon, SiN, $Ta_2O_5$, $TiO_2$, GaP or ZnS.

8. An apparatus according to claim 1 further comprising a magnetic pole layer arranged in a plane perpendicular to said thin film metallic layer.

9. An apparatus according to claim 8 wherein the thin film metallic layer and the first, second and third dielectric layers are all arranged on only one side of the magnetic pole layer.

10. An apparatus according to claim 1, wherein the first dielectric layer includes a tapered surface adjacent to the thin film metallic layer.

* * * * *

UNITED STATES PATENT AND TRADEMARK OFFICE
CERTIFICATE OF CORRECTION

PATENT NO. : 7,444,054 B2
APPLICATION NO. : 11/504180
DATED : October 28, 2008
INVENTOR(S) : William Albert Challener It is certified that error appears in the above-identified patent and that said Letters Patent is hereby corrected as shown below:

Background of the Invention

Column 1, Line 55
"...wavelength of 500 nm is ~$6 \times 10^6$ of the amount that would be..."
Should Read
"...wavelength of 500 nm is ~$6 \times 10^{-6}$ of the amount that would be..."

Detailed Description of the Invention

Column 8, Line 16
"According to the diffraction limit in Eq. (1), be possible to..."
Should Read
"According to the diffraction limit in Eq. (1), it should be possible to..."

Signed and Sealed this

Twenty-sixth Day of January, 2010

David J. Kappos
*Director of the United States Patent and Trademark Office*